United States Patent
Viale

(10) Patent No.: US 6,485,213 B1
(45) Date of Patent: Nov. 26, 2002

(54) HOLDING AND SHOCK-ABSORBING DEVICE AND SYSTEM FOR TEMPORARILY SECURING AN ELEMENT TO A STRUCTURE EQUIPPED WITH THE DEVICE

(75) Inventor: Daniel Viale, Tanneron (FR)

(73) Assignee: Alcatel, Paris (FR)

( * ) Notice: Subject to any disclaimer, the term of this patent is extended or adjusted under 35 U.S.C. 154(b) by 153 days.

(21) Appl. No.: 09/704,702

(22) Filed: Nov. 3, 2000

(30) Foreign Application Priority Data

Nov. 4, 1999 (FR) .............................. 99 13798

(51) Int. Cl.[7] ................................ B64G 1/64
(52) U.S. Cl. ................. 403/12; 403/109.3; 403/109.1; 403/14
(58) Field of Search .............. 403/11, 12, 13, 403/14, 109.1, 109.3; 244/158 R

(56) References Cited

U.S. PATENT DOCUMENTS

| | | | | |
|---|---|---|---|---|
| 4,347,023 A | * | 8/1982 | Rizos ................. | 244/158 R X |
| 4,419,033 A | * | 12/1983 | Roth et al. ........... | 244/158 R X |
| 4,641,798 A | * | 2/1987 | De Haan et al. ........ | 244/158 R |
| 5,702,069 A | * | 12/1997 | Geyer et al. ......... | 244/158 R X |
| 5,722,510 A | | 3/1998 | Viale | |
| 6,119,984 A | * | 9/2000 | Devine ................. | 244/158 R |

FOREIGN PATENT DOCUMENTS

FR          2 768 401 A          3/1999

* cited by examiner

Primary Examiner—Lynne H. Browne
Assistant Examiner—John R. Cottingham
(74) Attorney, Agent, or Firm—Sughrue Mion, PLLC

(57) ABSTRACT

A system including a retaining member passing through an element and connected at one end to a structure and bearing at the other end on an external side of the element; a separating mechanism for separating the member from the structure to move the element from a folded position to a deployed position; and a drive mechanism for pulling the corresponding part of the retaining member outwards after actuation of the separator mechanism. The system has a device which includes a barrel receiving the retaining member concentrically, cut-outs in the wall of the barrel forming spring tongues adapted to be bent wholly or partially towards the inside of the barrel in order to come into contact with the part, an enlargement of which is adapted to cooperate with the tongues to hold the member after actuation of the drive mechanism.

12 Claims, 3 Drawing Sheets

HOLDING AND SHOCK-ABSORBING DEVICE AND SYSTEM FOR TEMPORARILY SECURING AN ELEMENT TO A STRUCTURE EQUIPPED WITH THE DEVICE

The present invention relates generally to securing and deploying an articulated set of elements on a spacecraft.

BACKGROUND OF THE INVENTION

Articulated sets of elements such as solar generator panels, antennas, heat radiators, spacer arms, etc. are secured on spacecraft. This is known in the art.

In the present context, the expression "solar generator panels" refers to all the plane structures of the solar generator having optical, thermal or photovoltaic active surfaces, and in particular:

- panels supporting an array of identical or different photovoltaic cells for converting solar energy into electrical energy;
- reflector panels which concentrate solar radiation onto the previous panels by means of a coating with appropriate properties; and
- panels used for their surface thermo-optical characteristics (heat radiators).

During transfer from the ground to a basic transfer orbit that the spacecraft occupies before it is moved to the geosynchronous orbit, or even during transfer from the ground to the geosynchronous orbit, the elements are folded and pressed against the body of the spacecraft in a configuration referred to as the "stacking configuration".

Putting the elements into operational service, for example when the vehicle is a satellite that has been moved to its service orbit, entails moving each element to a deployed position relative to the body of the vehicle: this is referred to as "unstacking".

Securing systems including at least one retaining member passing through each element are usually employed for this purpose.

One such system is described in the patent DE-A-3 106 099 in particular. To prevent a retaining member damaging said elements by coming into contact with them during their deployment, the above prior art document proposes to move the retaining member outwards once it has been cut, to disengage it from said folded elements. To this end, drive spring means are disposed-between the retaining member and the outermost element of the articulated set. In the folded position of the set of elements, the drive spring means are charged and the retaining member prevents them from relaxing. However, when the retaining member has been broken, the spring means relax to move the retaining member into a position in which it is disengaged from said elements.

In similar systems, to absorb the shock due to the ejection of the retaining member after it is cut, the retaining member is thrown onto a honeycomb structure shock absorber. A honeycomb structure shock absorber cannot retain the retaining member in a given position, for example on the rear face of a solar panel, in order to prevent it casting shadows on the photovoltaic cells of the panel, and more generally to prevent it interfering with the operation of the element that has been deployed.

Also, to carry out tests on the ground under different conditions it is necessary to have several shock absorbers suitable for the range of energies to be absorbed. What is more, the shock absorbers are consumable (non-reusable).

OBJECTS AND SUMMARY OF THE INVENTION

The present invention aims in particular to overcome the above disadvantages.

To this end, it proposes a securing system for securing an element to a structure in a folded position, which element can assume either said folded position or a deployed position relative to the structure, said system comprising:

- a retaining member passing through the element in the folded position and connected at one end to said structure and bearing at the other end on an external side of the element;
- means for rupturing said retaining member or its connection to said structure when the element is required to move from its folded position to its deployed position; and
- a mechanism including drive means for pulling the corresponding part of the retaining member outwards through the element after actuation of said rupture means, the retaining member having an enlargement in the part which is pulled by the drive means, the system further comprising a holding and shock-absorbing device mounted on the element and including a barrel with an orifice passing through it adapted to receive the retaining member concentrically, a plurality of cut-outs in the wall of the barrel forming a plurality of spring tongues adapted to be bent wholly or partially towards the inside of the barrel in order to come into contact with the part of the retaining member which is pulled by the drive means, the enlargement being adapted to cooperate with said tongues to hold the retaining member after actuation of the drive means.

Because of the above features, the shock due to the ejection of the retaining member is absorbed and the retaining member is held in a required position by a single one-piece device.

Moreover, because it is possible to bend the spring blades wholly or partly towards the inside of the barrel, numerous adjustments are catered for, enabling shock to be absorbed as required.

Also, the device can absorb a very wide range of energies.

In a preferred embodiment, the blades can be returned to their original position within the envelope defined by the barrel.

To this end the holding and shock-absorbing device can be machined from a highly elastic material. This produces a non-consumable device that can therefore be reused.

According to preferred features, which may be combinable:

- the cut-outs have an inverted U-shape;
- the spring tongues are mutually offset in the longitudinal direction of the barrel;
- the spring tongues are arranged in a staggered configuration;
- the barrel has at one end an annular projection penetrating into the orifice perpendicularly to the longitudinal axis of the barrel and having an inside end which has a rounded profile in elevation;
- the barrel is made from an alloy of copper and beryllium;
- the shape of the enlargement can be varied to enable the retaining member to be used under different conditions of use;
- the element is an outermost panel of a set of panels of a solar generator hinged to each other and to the structure, the panels being superposed in the folded position of the set and at least substantially aligned with each other end-to-end in the deployed position of the set, and at least one retaining member passing through the panels in the folded position and having an enlargement adapted to cooperate with spring tongues of a corresponding holding and shock-absorbing device;

the barrel has an external flange for immobilizing the barrel which is located between the outermost panel and the directly adjacent panel in the folded position of the set of panels;

the mechanism includes additional drive means acting in the opposite direction to the drive means and adapted to move each retaining member which has been released into a position, and holding it in that position, relative to said outmost panel which, at least when said set of panels is in a deployed position, is at least substantially the same as the position which the retaining member occupied in the folded position of the set of panels before actuation of the rupture means, and the barrel having an outside flange on which the drive means and the additional drive means bear; and the drive means and the additional drive means are coil springs through which the retaining member passes.

The present invention also relates to the holding or position maintaining device as such.

BRIEF DESCRIPTION OF THE DRAWINGS

The present invention is described below in greater detail and with reference to the accompanying drawings, in which.

MORE DETAILED DESCRIPTION

Figure 1:
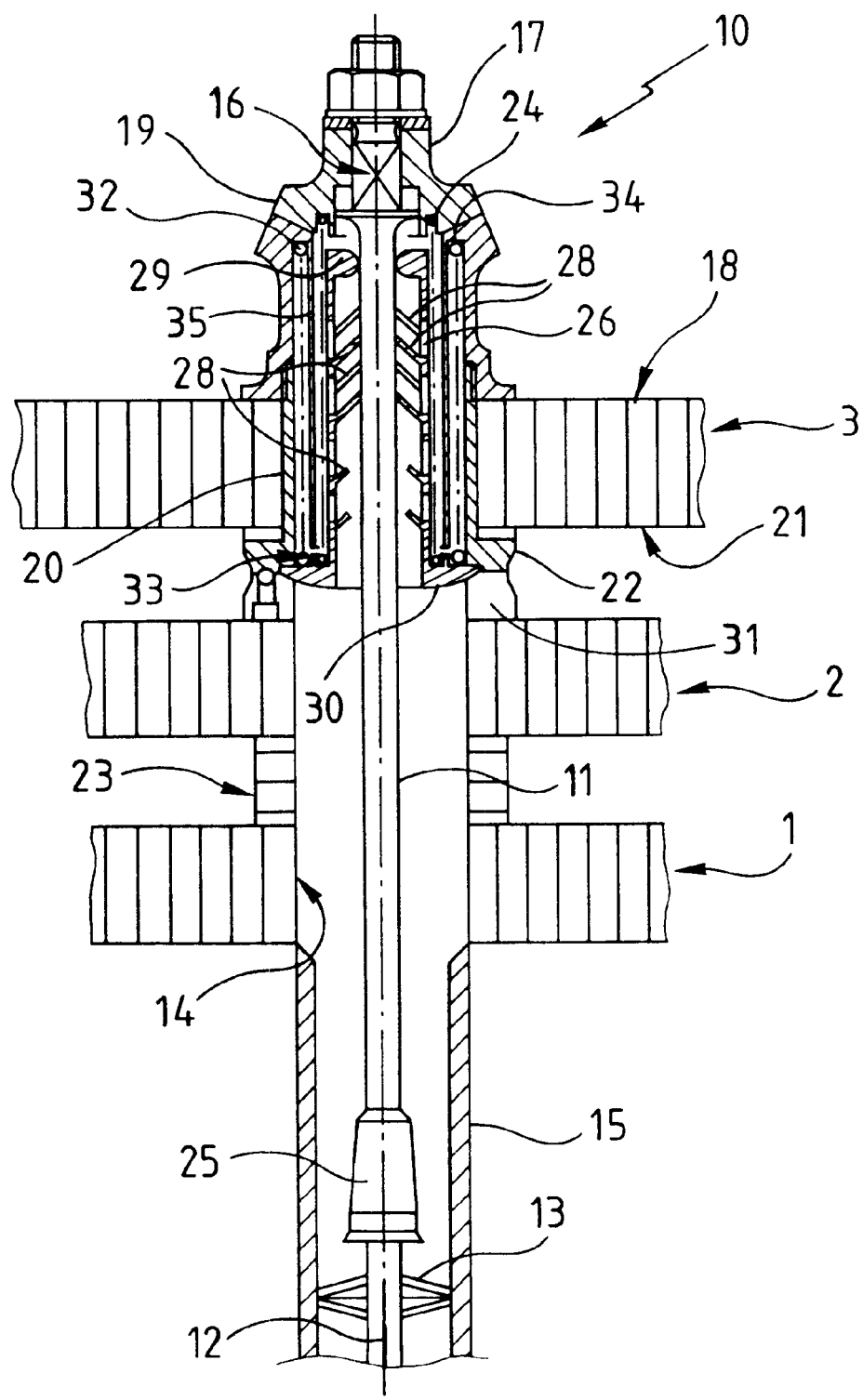
FIG. 1 is a diagrammatic fragmentary elevation view in cross section of a set of panels equipped with a securing system constituting one embodiment of the present invention.

FIG. 1 shows a very small part of a set of three solar generator panels 1, 2 and 3 occupying a folded position in which they are superposed to form a stack. They are locked in this position by means of a securing system described in greater detail below.

The hinges between the panels cannot be seen in the drawings. They connect parallel edges of the panels and are of the type described in U.S. Pat. No. 5,086,541. The pivoting connection of the innermost panel 1 to the body of the spacecraft is not shown either.

Note once again that the panels 1, 2, 3 form a solar generator and that the spacecraft is generally equipped with two such generators, connected to two opposite faces of its body and symmetrical to each other both in the folded position and in the deployed position of the panels, in which the panels are at least essentially aligned end-to-end.

Of course, the number and the shape of the panels can be different. Likewise the number of sets of solar panels provided on the spacecraft may be different. Furthermore, the application of the securing system to a set of solar panels is not limiting on the invention. The securing system can in particular be used to secure any space appendage of a spacecraft to the body of the spacecraft.

The securing system 10 for securing the set of panels 1–3 in the folded position includes at least one retaining member 11, for example a rod or a tie-rod which has an inner end 12 attached to the body of the spacecraft and faces rupture means 13, for example pyrotechnic rupture means, which are also fastened to the body of the spacecraft.

There is a passage through each of the panels 1–3 and, in the folded position of the panels, the juxtaposed passages form a continuous passage 14 for the retaining member 11.

An abutment 15 fastened to the structure or body. of the spacecraft provides a support for the set of panels 1–3. The outer end 16 of the retaining member 11 is fixed to an abutment member 17 which bears on the outside face 18 of the outermost panel 3 via an intermediate abutment member 19.

The intermediate member 19 is force-fitted onto a cylindrical part 20 concentric with the retaining member 11 and projecting from the panel 3 on both sides. The cylindrical part 20 terminates in an external annular projection 22 on the same side as the inside face 21 of the panel 3. A system of abutments 23 defining the separation between the panels 1 and 2 can also be seen in FIGS. 1 and 2. The separation between the panels 2 and 3 is fixed in particular by the annular projection 22.

Because of the above features, the panels 1–3 are held rigidly, when in the folded position, not only relative to each other but also relative to the body of the spacecraft.

The rupture means 13 are adapted, when actuated, to separate the retaining member 11 from the spacecraft, thus enabling the solar panels to move from the folded position (see FIG. 1, in which the panels are parallel to the longitudinal axis of the spacecraft, for example) to the deployed position (not shown, in which the panels are orthogonal to the longitudinal axis of the spacecraft, for example), for example spontaneously due to the action of springs incorporated in the above-mentioned hinges.

To prevent the retaining member 11 damaging the panels 1–3 when they move from their folded position to their deployed position, the securing system includes, in a manner that is known in the art, an extractor mechanism with drive spring means for pulling the corresponding part of the retaining member 11 through the solar panels 1–3 and in the direction of the outside face 18 of the panel 3 after the rupture means 13 are actuated.

To be more precise, the mechanism includes a coil spring 24 which is loaded when the set of solar panels 1–3 is in the folded position. After the pyrotechnic rupture means 13 have been actuated, the spring 24 releases its energy and relaxes (see FIG. 2), entraining the end 16 of the retaining member 11 towards the outside of the outermost panel 3, in a position remote from the spacecraft. The solar panels 1–3 can then be deployed around their respective hinges.

The retaining member 11 further includes an enlargement 25 to stop movement of the retaining member 11 due to the effect of the extractor spring 24.

The enlargement 25 is on the part of the retaining member 11 that is pulled by the spring 24, in the vicinity of the break area produced by the rupture means 13. It is frustoconical in shape with the top directed towards the top end 16 of the retaining member 11.

At the end of the extraction stroke of the retaining member 11 (see FIG. 2), the enlargement 25 cooperates with a holding and shock-absorbing device which is particularly novel and is mounted on the outermost panel 3.

Figure 3:
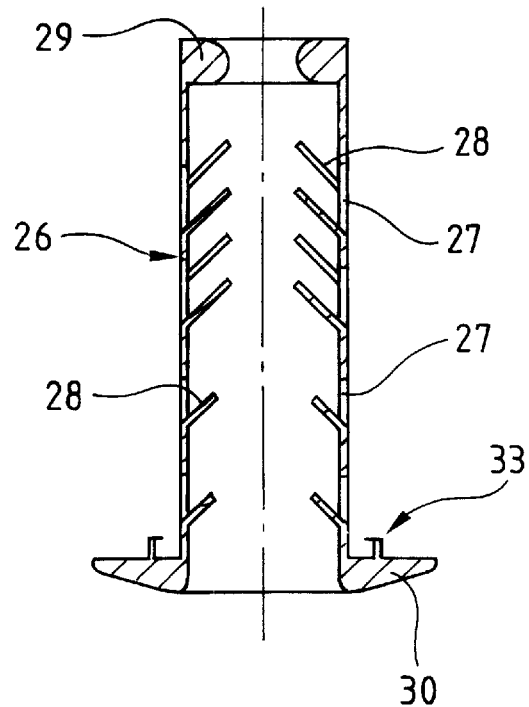
FIG. 3 is a diagrammatic elevation view in section taken along the axis. of revolution and to a larger scale, showing the position-maintaining and shock-absorbing device used in the securing system shown in FIGS. 1 and 2.
Figure 4:
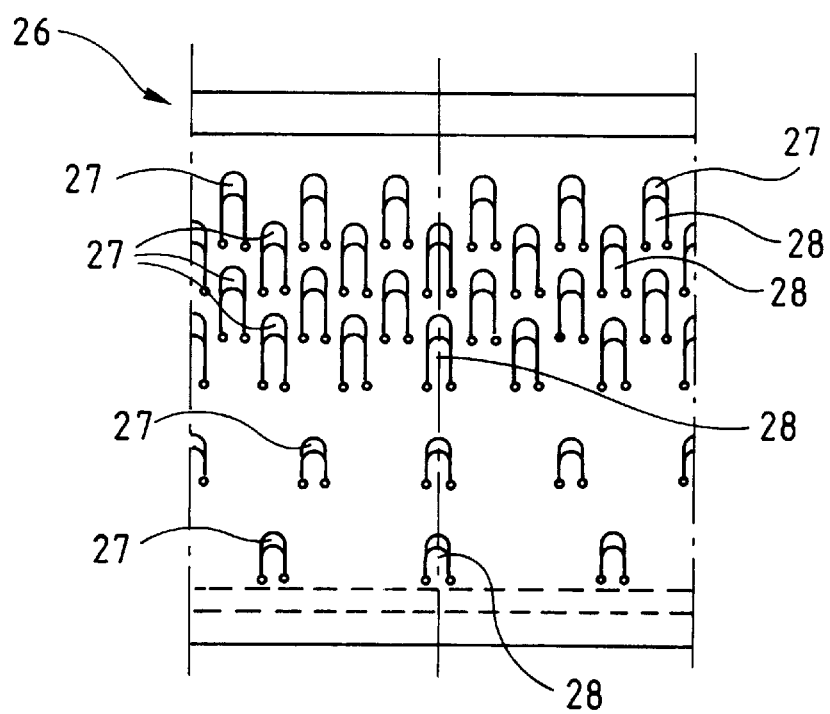
FIG. 4 is a diagrammatic plan view of the peripheral surface of the device shown in FIG. 3.

As can be seen in FIGS. 3 and 4, the device includes a barrel 26 through which extends an orifice receiving concentrically the retaining member 11. The barrel 26 is itself concentrically inside the cylindrical part 20. A plurality of cut-outs 27 (to clarify the drawing, not all the cut-outs that can be seen in the drawings are identified by this reference number) are formed in the wall of the barrel 26, and form a plurality of tongues 28 (similarly to the cut-outs 27, only some of the tongues are identified by the reference number 28 in the drawings), which tongues can be wholly or partially bent towards the inside of the barrel 26 in order to come into contact with the part of the retaining member 11 which is pulled by the extractor spring 24 and in particular with the enlargement 25 which cooperates with the tongues 28 to hold the retaining member 11 after the extractor spring 24 has acted. To render the tongues 28 elastic they are machined from a highly elastic material such as a spring steel based on a copper and beryllium alloy, for example. Using a material of this kind also returns the tongues 28 to their original position, within the envelope defined by the barrel 26, so that the holding and shock-absorbing device can be reused under different conditions.

Furthermore, as can be seen in FIG. 4, the cut-outs 27 are of inverted U-shape and the resulting elastic tongues 28 are mutually offset in the longitudinal direction of the barrel 26. To be more precise, the elastic tongues 28 are arranged in a staggered configuration. In this connection, note that the tongues 28 of the top four rows are closer together in the circumferential direction and in the longitudinal direction of the barrel 26 than are the tongues 28 of the rows at the bottom end of the barrel 26, i.e. the end of the barrel 26 which is at the same end as the inside face 21 of the panel 3.

The tongues 28 of these bottom two rows are also shorter than are the other tongues, because they are intended to come into contact with the base of the frustoconical enlargement 25.

The barrel 26 also has at its top end (i.e. the end projecting from the outside face 18 of the panel 3 in the configuration with the barrel 26 mounted on the panel 3) an annular projection 29 which penetrates into the orifice formed by the barrel 26, perpendicularly to the longitudinal axis of the barrel 26. The projection 29 is adapted to guide the rod of the retaining member 11 and to this end has an inside end which has a rounded profile in elevation.

Because of the above features, the spring tongues 28 absorb the shock of the impact of the retaining member on the outermost panel 3 by applying friction to the retaining member 11 and then stop the enlargement 25 which has become interengaged with the tongues 28 and is therefore held by the tongues 28, i.e. maintained in the same position. This avoids unwanted movements of the retaining member 11 if it is subjected to spurious impulses, and in particular prevents it returning to its original position. Of course, the holding and shock-absorbing device is also able to absorb shocks resulting from the action of the rupture means 13.

Moreover, this device caters for numerous adjustments, depending on the number of tongues bent towards the inside of the barrel 26. In this way a very wide range of requirements in terms of the shock to be absorbed can be catered for. This is particularly beneficial when performing tests on the ground, especially as the device is reusable.

To this end, in other embodiments, the shape of the enlargement 25 can be varied, enabling the retaining member 11 to be used under different conditions of use.

The barrel 26 also has an external flange 30 at its bottom end, in particular to enable it to be immobilized between the outermost panel 3 and the directly adjacent panel (i.e. the panel 2) in the folded position of the set of panels.

To this end the flange 30 bears on one side on the annular projection 22 and has on the other side a convex surface which in the folded position bears on a coincident concave surface of a structure 31 disposed between the flange 30 and the panel 2. This forms a ball-joint facilitating deployment of the panel 3 relative to the panels 1 and 2 after the extractor spring 24 has functioned. The spring bears on the flange 30.

During this deployment, which is not shown in the figures, the retaining member 11 can be held by the holding device on the same side as the outside face 18 of the panel 3. For example, this will be the case when the panel 3 is the outermost panel in the transfer configuration. In this case, it is the face 21 that carries the solar cells of the panel 3 and it is therefore desirable to hold the retaining member 11 from the side of the outside face 18, which is also the rear face of the panel 3 in this case, in order not to cast shadows on its cells.

On the other hand, additional drive means are provided if the solar cells are on the face of the panel that is on the same side as the retaining member 11 after the extractor spring 24 has functioned. In this example the additional drive means comprise a retractor coil spring 32 which functions in the opposite direction to the spring 24 and is adapted to move and hold the retaining member 11 from the same side as the face 21 of the panel 3. In other words, when the set of panels is in the deployed position, the retaining member is in substantially the same position relative to the panel 3 as it occupied in the folded position of the set, before the rupture means 13 were actuated.

To this end, the retractor spring 32 bears on the flange 30 at one end, where there is a spring retaining and locating structure 33. The other end of the spring 24 abuts on an annular abutment shoulder 34 which is part of the intermediate member 19. To be more precise, the abutment shoulder 34 is in the area of the intermediate member 19 against which the abutment member 17 of the retaining member 11 abuts in the folded position of the set of panels. The spring 32 surrounds the spring 24 which In turn surrounds the barrel 26. Cylindrical guide means 35 are disposed between the springs 24 and 32 to guide them laterally.

The springs 24 and 32 are chosen so that the expansion force of the spring 32 is greater than that of the spring 24.

Figure 2:
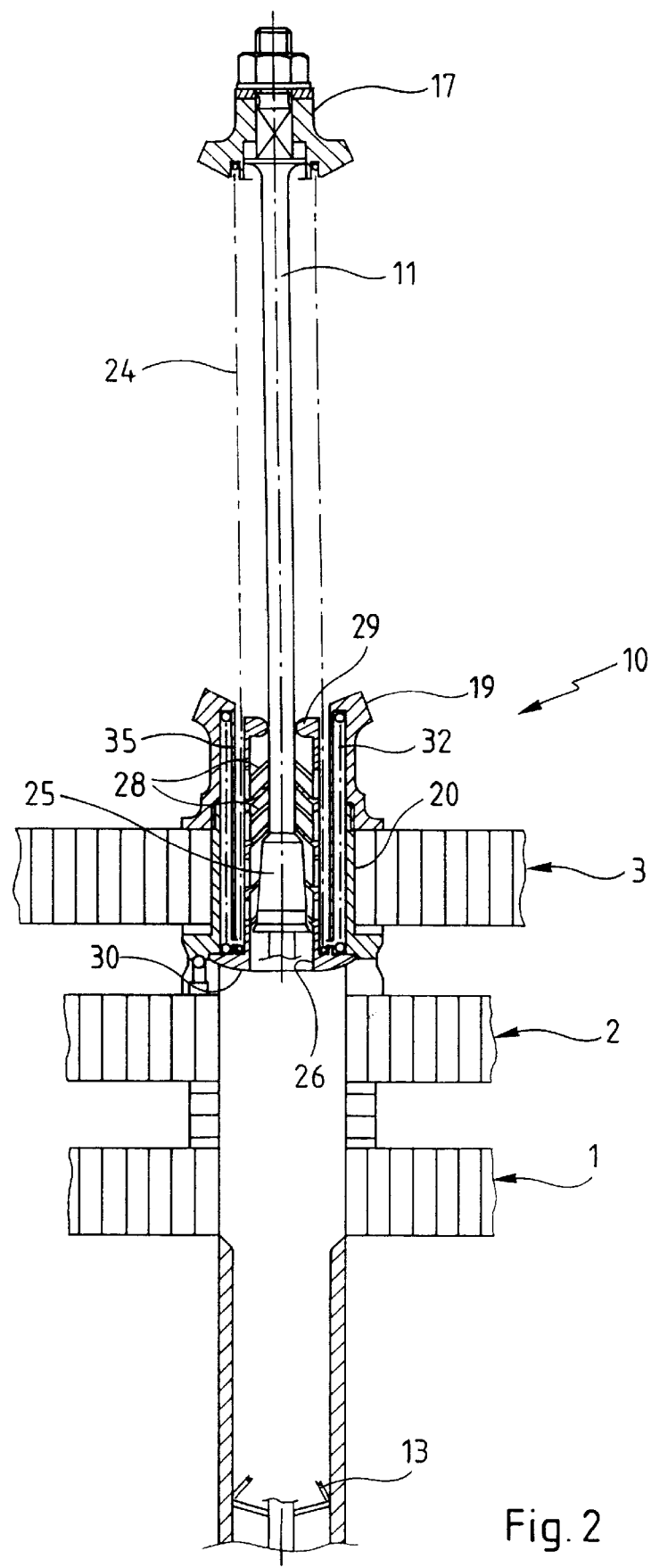
FIG. 2 is a view similar to that of FIG. 1 showing the securing system in operation.

Accordingly, when it is desired to deploy the panels 1 to 3, the rupture means 13 are actuated to cut the retaining member 11. The spring 24 then relaxes and pulls the retaining member 11 through the panels 1 to 3, until it projects outwards from the outside face 18 of the panel 3 (FIG. 2).

The panels 1 to 3 can then be deployed. Note that, as long as the panels 2 and 3 remain in contact after the retaining member 11 is broken, the spring 32 continues to be loaded, since the flange 30 is held between them. On the other hand, as soon as the panels 2 and 3 are moved apart (on deployment, not shown in the figures), the flange 30 is released and the spring 32 can relax. The retaining member 11 is then pulled by the spring 32 by virtue of the thrust applied by the spring to the flange 30 of the barrel 26 in which the retaining member 11 is held. The retaining member 11 therefore resumes its initial position during deployment.

Of course, the present invention is in no way limited to the chosen embodiment shown in the figures, but encompasses any variant that may suggest itself to the skilled person.

In particular, the drive means, which in this example are coil springs, could be replaced by a shape memory alloy system. Similarly, the rupture means could also consist of a shape memory alloy system.

Moreover, the disposition and the shape of the cut-outs 27 could be different and the tongues 28 could be inclined differently towards the axis of the barrel 26, as required.

Nor is the configuration of the barrel 26 limited to a circular section cylinder.

What is claimed is:

1. A securing system for securing an element to a structure in a folded position, which element can assume either said folded position or a deployed position relative to the structure, said system comprising:

a retaining member passing through the element in the folded position and connected at one end to said structure and bearing at the other end on an external side of the element;

means for rupturing said retaining member or its connection to said structure when the element is required to move from its folded position to its deployed position; and a mechanism including drive means for pulling the corresponding part of the retaining member outwards through the element after actuation of said rupture means, the retaining member having an enlargement in the part which is pulled by the drive means, the system further comprising a holding and shock-absorbing device mounted on the element and including a barrel with an orifice passing through it adapted to receive the retaining member concentrically, a plurality of cut-outs in the wall of the barrel forming a plurality of spring tongues adapted to be bent wholly or partially towards the inside of the barrel in order to come into contact with the part of the retaining member which is pulled by the drive means, the enlargement being adapted to cooperate with said tongues to hold the retaining member after actuation of the drive means.

2. A system according to claim 1, wherein the tongues are adapted to be moved back into their original position within the envelope defined by the barrel.

3. A system according to claim 2, wherein the cut-outs have an inverted U-shape.

4. A system according to claim 1, wherein the spring tongues are mutually offset in the longitudinal direction of the barrel.

5. A system according to claim 4, wherein the spring tongues are arranged in a staggered configuration.

6. A system according to claim 1, wherein the barrel has at one end an annular projection penetrating into the orifice perpendicularly to the longitudinal axis of the barrel and having an inside end which has a rounded profile in elevation.

7. A system according to claim 1, wherein the barrel is made from an alloy of copper and beryllium.

8. A system according to claim 1, wherein the shape of the enlargement can be varied to enable the retaining member to be used under different conditions of use.

9. A system according to claim 1, wherein the element is an outermost panel of a set of panels of a solar generator articulated to each other and to the structure, the panels being superposed in the folded position of the set and at least substantially aligned with each other end-to-end in the deployed position of the set, and at least one retaining member passing through the panels in the folded position and having an enlargement adapted to cooperate with spring tongues of a corresponding holding and shock-absorbing device.

10. A system according to claim 9, wherein the barrel has an external flange for immobilizing the barrel which is located between the outermost panel and the directly adjacent panel in the folded position of the set of panels.

11. A system according to claim 9, wherein said mechanism includes additional drive means acting in the opposite direction to the drive means and adapted to move each retaining member which has been released into a position, and holding it in that position, relative to said outmost panel which, at least when said set of panels is in a deployed position, is at least substantially the same as the position which the retaining member occupied in the folded position of the set of panels before actuation of the rupture means, and the barrel having an outside flange on which the drive means and the additional drive means bear.

12. A system according to claim 11, wherein the drive means and the additional drive means are coil springs through which the retaining member passes.

\* \* \* \* \*